(No Model.) 3 Sheets—Sheet 1.

O. MULVEY.

APPARATUS FOR CARBURETING AIR.

No. 498,673. Patented May 30, 1893.

Witnesses.
N. B. Hagin
W. C. Hutchins

Inventor.
Oliver Mulvey.
By Wm. J. Hutchins, atty.

THE NORRIS PETERS CO., PHOTO-LITHO., WASHINGTON, D. C.

(No Model.) 3 Sheets—Sheet 2.

O. MULVEY.

APPARATUS FOR CARBURETING AIR.

No. 498,673. Patented May 30, 1893.

Witnesses.

N B Hagin

W. C. Hutchins

Inventor.

Oliver Mulvey

By Wm J. Hutchins, atty.

THE NORRIS PETERS CO., PHOTO-LITHO., WASHINGTON, D. C.

(No Model.) 3 Sheets—Sheet 3.

O. MULVEY.

APPARATUS FOR CARBURETING AIR.

No. 498,673. Patented May 30, 1893.

Witnesses.
N. B. Hagin.
W. C. Hutchins

Inventor.
Oliver Mulvey
By Wm J. Hutchins
atty

THE NORRIS PETERS CO., PHOTO-LITHO., WASHINGTON, D. C.

UNITED STATES PATENT OFFICE.

OLIVER MULVEY, OF WICHITA, KANSAS.

APPARATUS FOR CARBURETING AIR.

SPECIFICATION forming part of Letters Patent No. 498,673, dated May 30, 1893.

Application filed April 25, 1892. Serial No. 430,460. (No model.)

*To all whom it may concern:*

Be it known that I, OLIVER MULVEY, a citizen of the United States of America, residing at Wichita, in the county of Sedgwick and State of Kansas, have invented certain new and useful Improvements in Apparatus for Carbureting Air, of which the following is a specification, reference being had therein to the accompanying drawings and the letters of reference thereon, forming a part of this specification, in which—

Figures 1, 2:
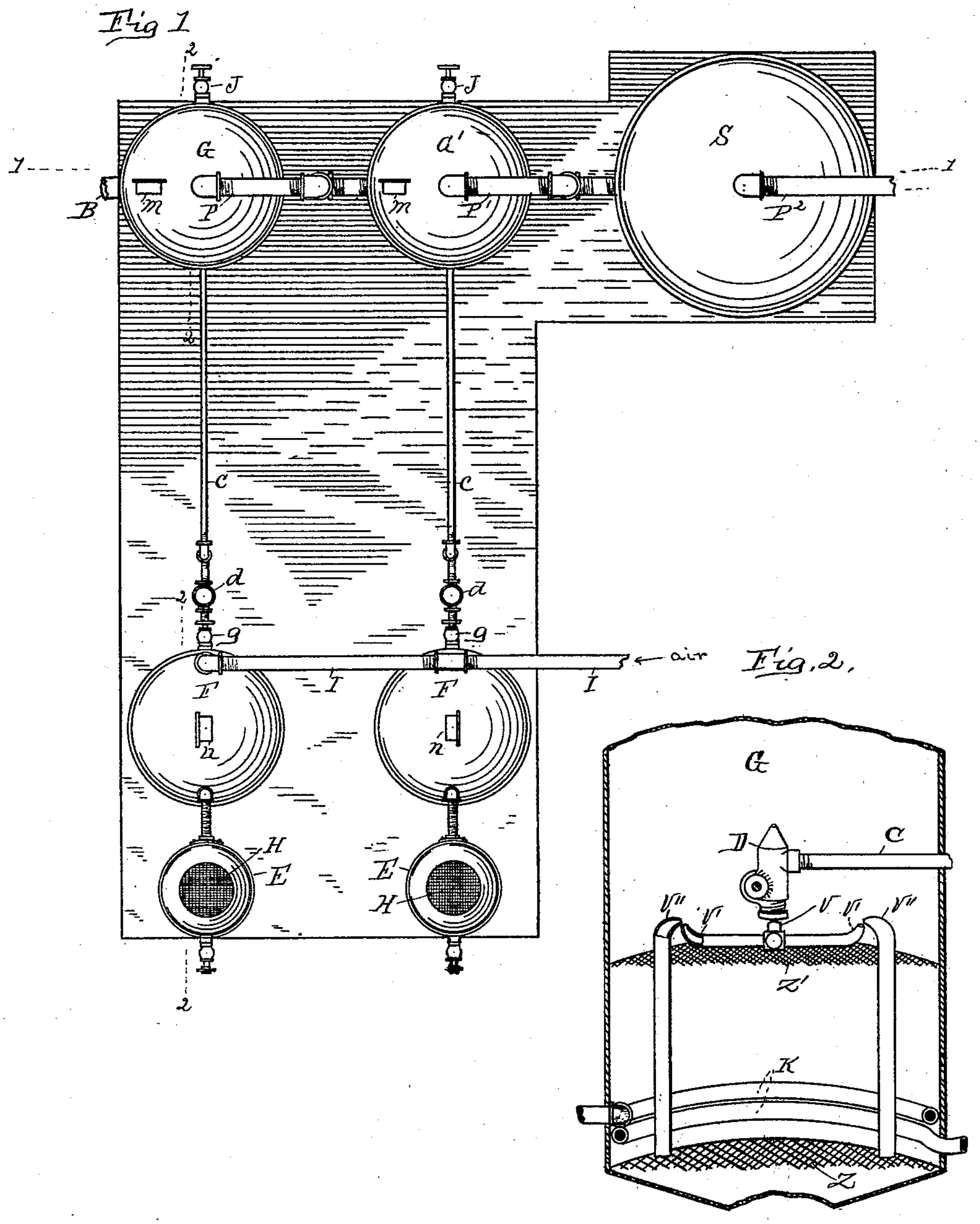
Figure 3:
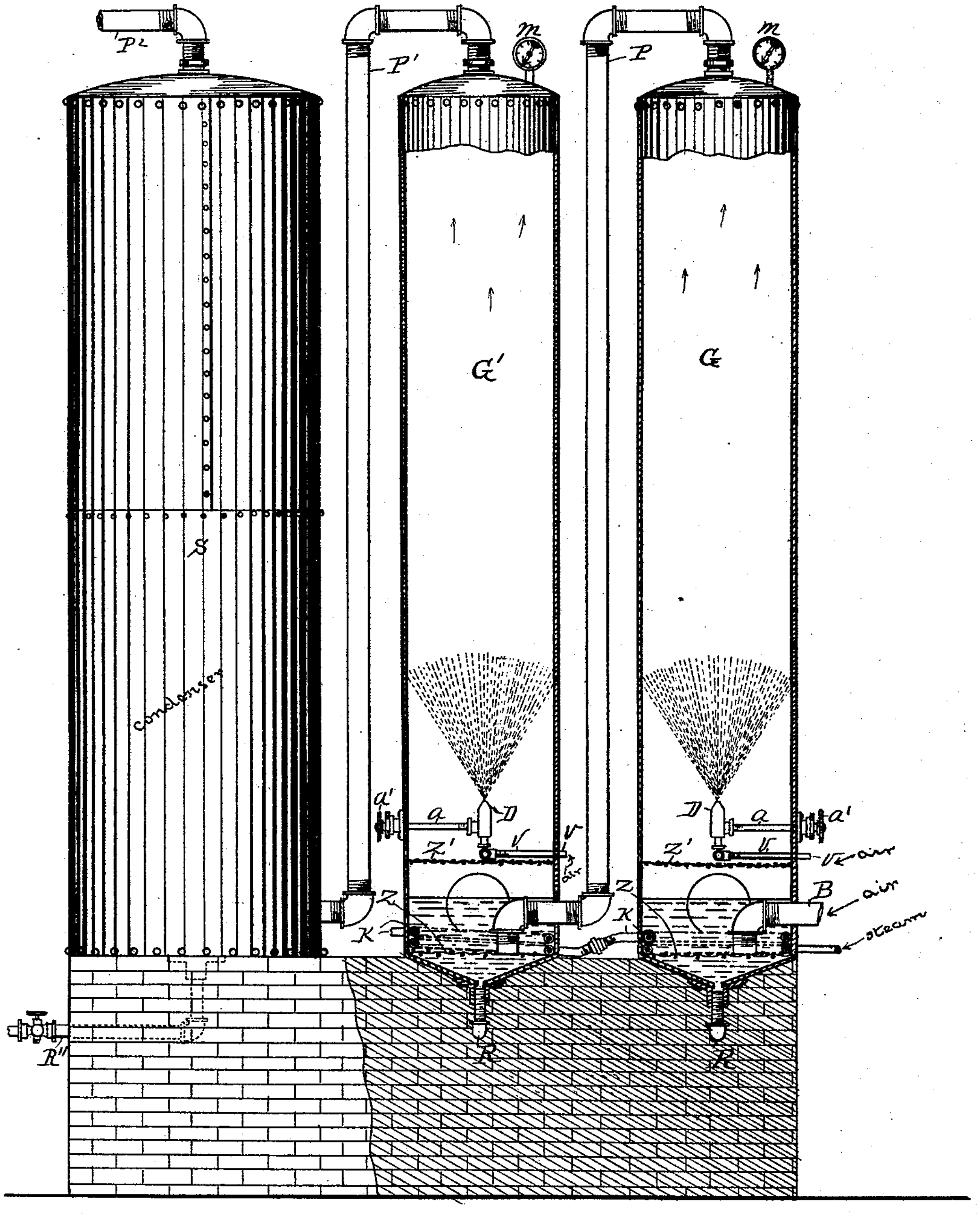
Figure 4:
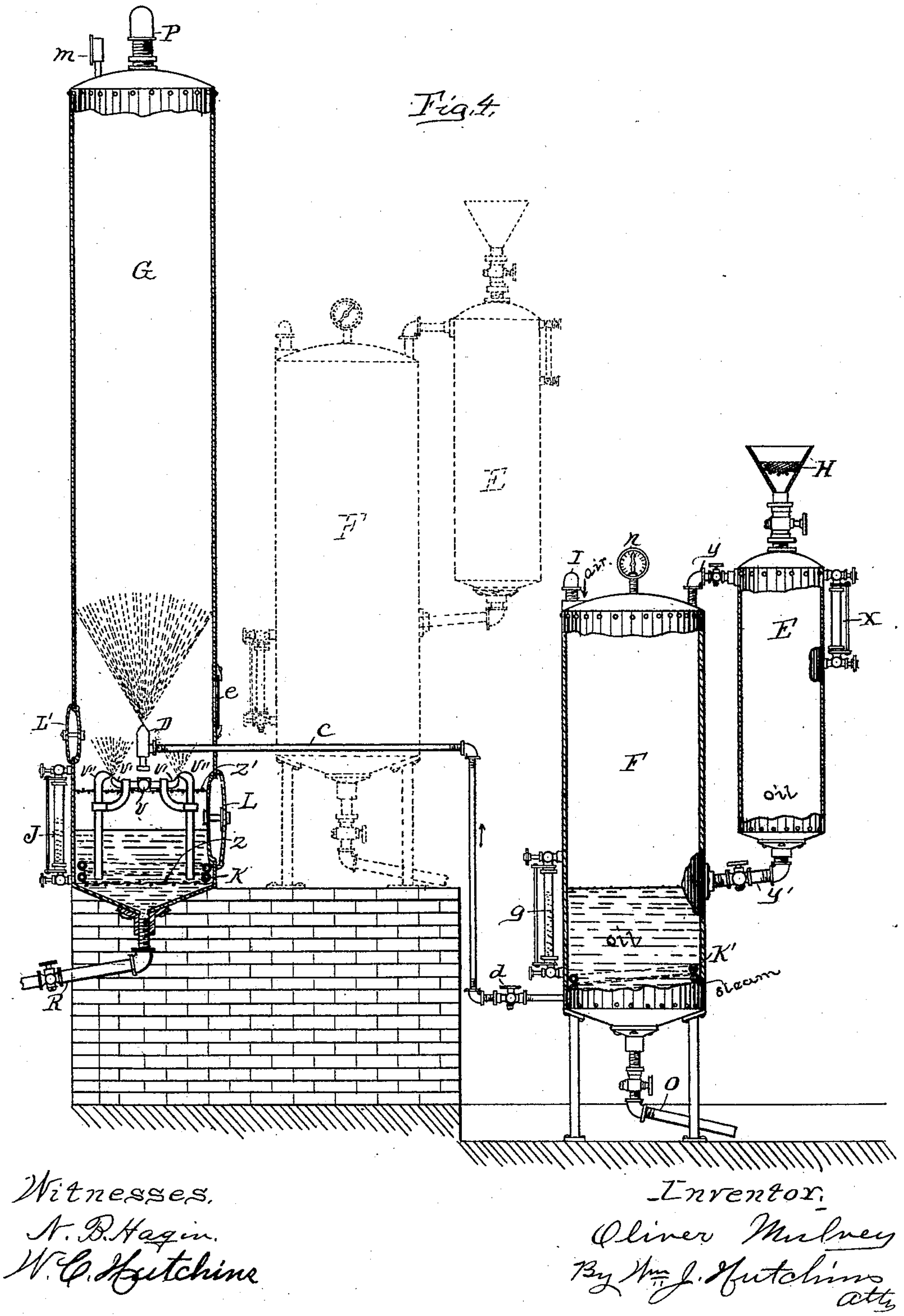

Figure 1, is a top plan of the apparatus; Fig. 2, a sectional elevation of the lower portion of one of the generating cylinders thereof; Fig. 3, a sectional elevation of the apparatus on line 1—1, of Fig. 1, showing, however, the scrubber cylinder thereof by side elevation, and Fig. 4, a similar, but reverse, elevation, on line 2—2, of Fig. 1.

This invention relates to certain improvements in apparatus for carbureting air; for illuminating and heating purposes; wherein air, under pressure, is intermingled with a spray, or sprays, of hydro-carbon-oil, which by means of pressure, is introduced in contact with such air in the form of a spray; and wherein, the oil of the spray, which has escaped evaporation, by means of such contact with the air, is further intermingled with such air by means of being atomized; thereby causing such air to become saturated with the vaporized oil, which improvements are fully set forth and described in the following specification, and pointed out in the claims.

Referring to the drawings G and G′ represent the carbureting cylinders; however, they may be of any convenient form, other than cylindrical; and are arranged in an upright position, on some suitable foundation, and are arranged connected together by means of a pipe P, which is connected with the upper portion of the cylinder G and arranged leading downwardly, and enters the lower portion of cylinder G′ and terminates within said cylinder with a downturned portion adjacent the cylinder bottom; P′ is a similar pipe leading from cylinder G′ in like manner, and enters, at its lower end, into, what is termed, a condenser, shown at S, and $P^2$ is a similar pipe leading from the upper portion of said condenser. Any desired number of such generating cylinders may be brought into service, arranged connected together in like manner as those described.

B represents an air blast pipe arranged leading from some source of compressed air, into the first cylinder G, terminating in the lower portion thereof in like manner as described of pipe P. Within each said cylinder immediately below said pipe terminals is arranged a cross screen Q, so that an air blast from the pipes will be diffused, and a little distance above said screen is a second screen Q′ which serves as a means of still further diffusing the air as it ascends in the cylinder. The bottom of each said carbureting cylinder is made inclined toward its center, and is therein provided with a discharge pipe R for drawing off refuse oil, and each said pipe is provided with a valve for regulating such discharge.

F represents oil feeding tanks, one for each carbureting cylinder, or one, of sufficient capacity may be used for all the carbureting cylinders, and are arranged connected with said carbureting cylinders by means of pipes *c*, leading from the lower portion of said tanks and terminating within the said carbureting cylinders, a little above the upper screen Q′, with oil spray valves D, set to spray upward, and of such class as to be adapted to be regulated in their spray discharge, by means of a shaft or valve stem *a* and an exterior hand wheel *a*′.

If desired each tank F may be provided with a filler receptacle E which is arranged connected at each end with the tank by means of pipes *y*—*y*′ as shown which have interposed valves to open or close their passage ways, and each filler E has a funnel shaped filter H connected therewith by means of a pipe extending from its upper end, and having a valve for admitting or cutting off the flow of oil into the filler. When the fillers are being charged with oil the valves of pipes *y*—*y*′ are closed, and when a sufficient quantity of oil is placed therein it is indicated by the gage X, when the valves of pipes *y*—*y*′ are opened, which permits the oil to flow into the tank F, where its quantity is made known by means of the gage *g*. The bottoms of tanks F are likewise inclined and provided with a discharge pipe *o*, which has a valve for regulating the discharge of refuse oil.

If desired the fillers E may be dispensed with and the tanks F be otherwise supplied.

I represents an air blast pipe arranged leading from some source of compressed air, to the upper portion of the tank or tanks F for the purpose of giving pressure to the oil in the tank or tanks, which pressure causes the oil to flow from said tank or tanks through pipes C and be expelled in the form of sprays from the spray valves D within the carbureting cylinders, as shown; such flow being permitted or cut off by means of the valves *d* of said pipes C. To indicate such pressure upon the oil, pressure gages N are arranged connecting the tank or tanks F, and to indicate the air blast pressure in the carbureting cylinders they are provided with similar gages M, as shown.

V represents an air blast pipe leading from some source of compressed air, into the carbureting cylinder, one in each cylinder, and terminates with the right and left reduced nozzles V′ V′ which discharge the air blast upward, and across the exit of similar nozzles of pipes V″ V″ which extend downwardly to a point near the bottom of the cylinder; the air blast from nozzles V′ V′ causing a suction within parts V″ V″, which draws up oil from the lower portion of the cylinder and discharges it jointly with the air blast, thus atomizing such oil, in like manner as is the result in ordinary atomizers.

In service certain portions of oil of the spray discharge, falls, the spray not being fully evaporated, and lodges in the bottom portions of the carbureting cylinders, where the blast, from pipes B, P and the like order of pipes, is made through such oil, and thereby facilitates in the evaporizing of such oil and saturating such air with such oil vapor, and at the same time the atomizers are continuously taking up such oil and assisting in such evaporation. The air blast entering the first carbureting cylinder from pipe B, is confined to said cylinder during its up passage therein, whence it is conducted on through pipe P into and through the second, or all the succeeding carbureting cylinders in like manner, and successive order, and in each cylinder such air absorbs the oil atoms and becomes more and more saturated with the evaporated oil substances, until it is fully saturated, when it enters into the condenser S; which condenser is for the purpose of receiving the carbureted air as it is discharged from the carbureting cylinders, and while therein the portions or particles therein contained which are not highly volatile are permitted to settle, while the volatile portion thereof is caused to be discharged by the inflowing, or succeeding charges of the same, and when excluded therefrom, it is conveyed through pipe $P^2$ to some suitable gasometer which is not necessary to be shown.

Each carbureting cylinder is made with hand holes L—L′ for gaining access to the interior thereof, and with a glazed observation hole *e* through which the spray may be seen, and are, each, also provided with a gage J for indicating the quantity of oil contained in their bottom portions, and are further, each, provided with a steam coil-pipe K in their lower portions for raising the temperature of the oil therein, from the influence of steam introduced in said coils, which steam is taken from some supply not necessary to be shown; also the feeding tank or tanks F are likewise supplied with steam coils K′ for a like purpose.

In the bottom of condenser S I have provided a discharge pipe R″ for drawing off refuse therefrom and with a valve for regulating such discharge.

Having thus described my invention, what I claim as new and useful, and desire to secure by Letters Patent, is as follows:

1. In the apparatus described, the combination of the carbureting cylinder, the oil supply tank; the oil feeding pipe thereof terminating within the cylinder; a spray jet arranged as the terminal of said pipe; the air-blast pipe leading to within the cylinder below said spray jet; and the diffusing screen arranged within the cylinder between the spray jet and air blast pipe, in the manner substantially as and for the purpose specified.

2. In the apparatus described, the combination of the carbureting cylinder; the oil supply tank; the oil feeding pipe thereof terminating within the cylinder; a spray jet arranged as the terminal of said pipe; the air blast pipe leading to within the cylinder below the spray jet; and the atomizer arranged within the cylinder between the spray jet and air blast pipe; in the manner substantially as and for the purpose specified.

3. In the carbureting apparatus described, the combination of the plurality of carbureting cylinders; the oil supply tank; the oil feeding pipes thereof leading from said tank to within said cylinders; spray jets arranged within the cylinders as the terminals of said pipes; the air-blast pipe arranged entering one of said cylinders; the carbureted air pipes arranged connecting said plurality of cylinders; the diffusing screens and atomizers respectively arranged in said cylinders, in the manner substantially as and for the purpose specified.

OLIVER MULVEY.

Witnesses:
W. C. HUTCHINS,
N. B. HAGIN.